(12) United States Patent
Kwak (10) Patent No.: US 7,606,661 B2
(45) Date of Patent: Oct. 20, 2009

(54) METHOD AND SYSTEM FOR DETERMINING PLACE FOR APPOINTMENT USING NAVIGATION SYSTEM

(75) Inventor: Min-Hyo Kwak, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 614 days.

(21) Appl. No.: 11/434,532

(22) Filed: May 15, 2006

(65) Prior Publication Data

US 2006/0271279 A1  Nov. 30, 2006

(30) Foreign Application Priority Data

May 30, 2005  (KR) .................... 10-2005-0045647

(51) Int. Cl.
  *G01C 21/00* (2006.01)
  *G01C 21/34* (2006.01)
(52) U.S. Cl. .................................... 701/209
(58) Field of Classification Search ................ None
  See application file for complete search history.

(56) References Cited

U.S. PATENT DOCUMENTS

| 6,424,910 | B1 | 7/2002 | Ohler et al. |
| 7,111,251 | B2* | 9/2006 | Komai ................ 715/844 |
| 7,376,511 | B2* | 5/2008 | Szabo et al. ................ 701/210 |
| 2002/0184063 | A1* | 12/2002 | Kaufman et al. ................ 705/7 |
| 2003/0125963 | A1* | 7/2003 | Haken ................ 705/1 |
| 2004/0039579 | A1 | 2/2004 | Chithambaram et al. |

FOREIGN PATENT DOCUMENTS

| EP | 1 434 032 | 6/2004 |
| WO | WO 2005/001386 A2 * | 1/2005 |

* cited by examiner

*Primary Examiner*—Michael J. Zanelli
(74) *Attorney, Agent, or Firm*—The Farrell Law Firm, LLP (57) ABSTRACT

A navigation terminal for calculating a route or a route information server sets multiple proposed locations for an appointment according to various conditions or options provided by a user for the determination of an appropriate location for the appointment between multiple parties. The navigation terminal or the route information server calculates an optimal route to each proposed location from each party's origin and extracts an optimum level of each calculated route to finally determine the most appropriate location for the appointment. The navigation terminal or the route information server automatically sets a location most appropriate and convenient to all parties of appointment, thereby enhancing convenience and effective time management.

25 Claims, 5 Drawing Sheets

METHOD AND SYSTEM FOR DETERMINING PLACE FOR APPOINTMENT USING NAVIGATION SYSTEM

PRIORITY

This application claims priority to an application entitled "Method and System for Determining Place for Appointment Using Navigation System" filed with the Korean Intellectual Property Office on May 30, 2005 and assigned Serial No. 2005-045647, the contents of which are incorporated herein by reference.

BACKGROUND OF THE INVENTION

1. Field of the Invention

The present invention relates to a navigation system, and more particularly to a method and system for determining an appropriate location for an appointment using a navigation system.

2. Description of the Related Art

When two or more people at different origins determine a location to meet, they generally tend to consider either a midpoint between the origins or a location known to all as the best location. After making an appointment to meet at approximately the midpoint, they may obtain route information to reach the destination using a navigation system. However, arbitrarily determined locations for appointment are not always the most convenient or best locations at which to meet. In certain cases, it may be inconvenient and take a longer time for either party to reach the destination due to such reasons as a longer travel distance and a lack of accessible public transportation. Therefore, an improved method to determine an appropriate location for an appointment is needed.

SUMMARY OF THE INVENTION

Accordingly, the present invention has been made to solve the above-mentioned problems occurring in the prior art, and an object of the present invention is to provide a method and a system for automatically determining a location for an appointment.

Another object of the present invention is to provide a method and system for determining the most appropriate location for an appointment, thereby enhancing convenience and effective time management.

In order to accomplish the above objects of the present invention, there is provided a method for determining a location for an appointment using a navigation system, which includes inputting appointment place setting options corresponding to two or more parties of the appointment, setting a plurality of proposed locations according to the inputted options, calculating an optimal route to each proposed location from an origin of each party according to the appointment location option corresponding to the party, determining how each optimal route complies with the appointment location option corresponding to each party to extract an optimum level of each calculated optimal route, and extracting optimum levels of optimal routes to each proposed location and comparing all the extracted optimum levels to determine a final location for the appointment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

The following description is provided to assist in a comprehensive understanding of various preferred embodiments of the present invention disclosed with reference to the accompanying figures. Accordingly, those of ordinary skill in the art will recognize that various changes and modifications of the preferred embodiments described herein can be made without departing from the scope and spirit of the claimed invention. Descriptions of well-known functions and constructions are omitted for the sake of clarity and conciseness.

According to the present invention, a navigation terminal or a route information server sets multiple proposed places according to various conditions provided by a user to determine a location for an appointment between multiple parties, calculates an optimal route to each proposed location from each party's origin, and extracts an optimum level of each calculated route to determine the most appropriate location for the appointment.

Figure 1:
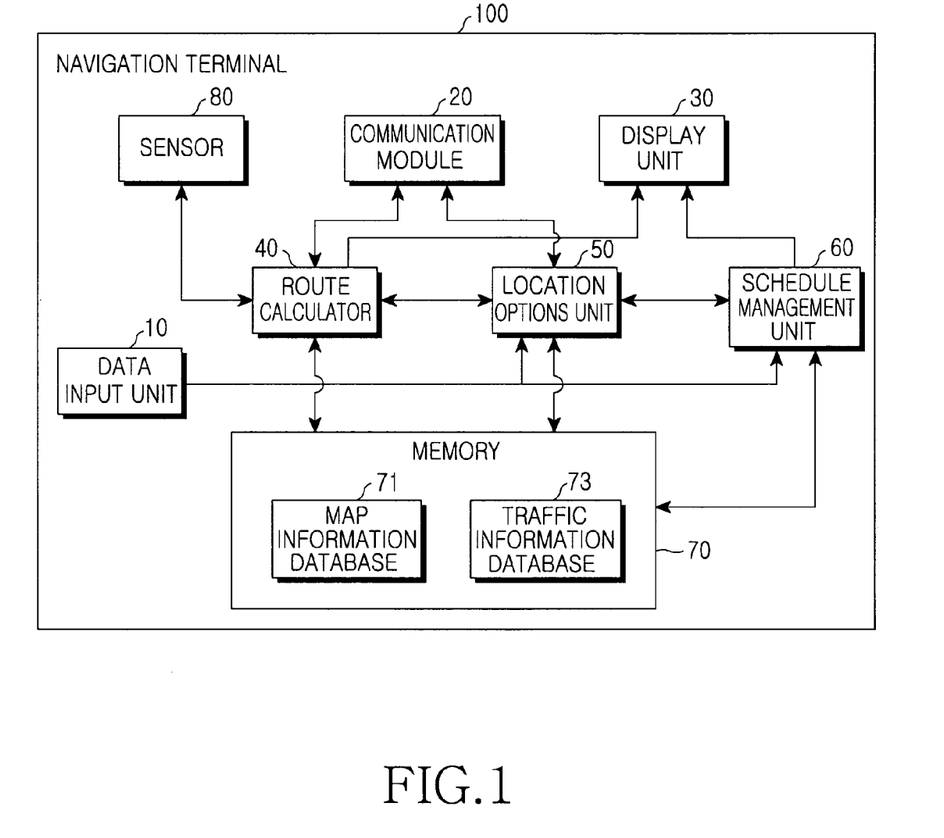
FIG. 1 is a block diagram of a navigation terminal according to the present invention.

FIG. 1 illustrates the structure of a navigation terminal 100 according to the present invention. As illustrated in FIG. 1, the navigation terminal 100 includes a sensor 80, a communication module 20, a display unit 30, a route calculator 40, a location options unit 50, a schedule management unit 60, a data input unit 10 and a memory 70.

As a means for measuring the current position of the navigation terminal 100, the sensor 80 includes a GPS sensor and a DR (Dead Reckoning) sensor. The GPS sensor receives GPS signals and detects position information (geometric coordinates x, y and z) and current time information t of a moving object, e.g. a car. The DR sensor detects its own relative position and moving direction based on previous position information. The DR sensor detects the velocity v and the steering angle θ of a car. The sensor 80 calculates the current position of the car based on the position information x, y, z and time information t obtained through the GPS sensor and the velocity v and steering angle θ obtained through the DR sensor.

The communication module 20 performs communication with another navigation terminal in a mobile communication network, and receives traffic information or map information from a route information server.

Under the control of the route calculator 40, location options unit 50 or schedule management unit 60, the display unit 30 displays information received from the mobile communication network, calculated route information or an image stored in the memory 70.

The data input unit 10 can be a keypad or a touch pad for providing an interface between a user and a navigation system. The user can input a starting point, destination or intermediate point and select a specific travel route or an option through the data input unit 10. Then, the data input unit 10 outputs a corresponding input signal and selection signal to the route calculator 10. The data input unit 10 also outputs appointment place setting options to the location options unit 50.

The route calculator 40 calculates a route from a starting point to a destination using an entire route option applied to the entire travel route between the origin and the destination and a subregion route option applied to a specific subregion in the travel route.

The schedule management unit 60 updates and manages schedules inputted by the user, and provides schedule information to remind the user of the inputted schedules at every date and time specified.

The location options unit 50 controls the operation of the route calculator 40 in order to set multiple proposed locations according to various options inputted through the data input unit 10 for the determination of an appropriate location for an appointment. The location options unit 50 calculates an optimal route to each proposed place from each party's origin, extracts an optimum level of each calculated optimal route and determines the most appropriate location for the appointment. The optimum level refers to a value showing how each calculated optimal route complies with the appointment location options previously inputted by the user.

The memory 70 includes a map information database 71 and a traffic information database 73. The map information database 71 stores map data showing roads, buildings and points of interest and information about accessible public transportation. The traffic information database 73 stores roadway traffic information. The map information and the traffic information are received from a route information center and updated in real-time. The memory 70 stores programs necessary to control the operation of the navigation terminal 100, reference data, various updateable data and routes calculated by the route calculator 40. The memory 70 serves as a working memory for the route calculator 40 and the location options unit 50. In addition, the memory 70 stores programs related to an appointment place setting menu.

Figure 2:
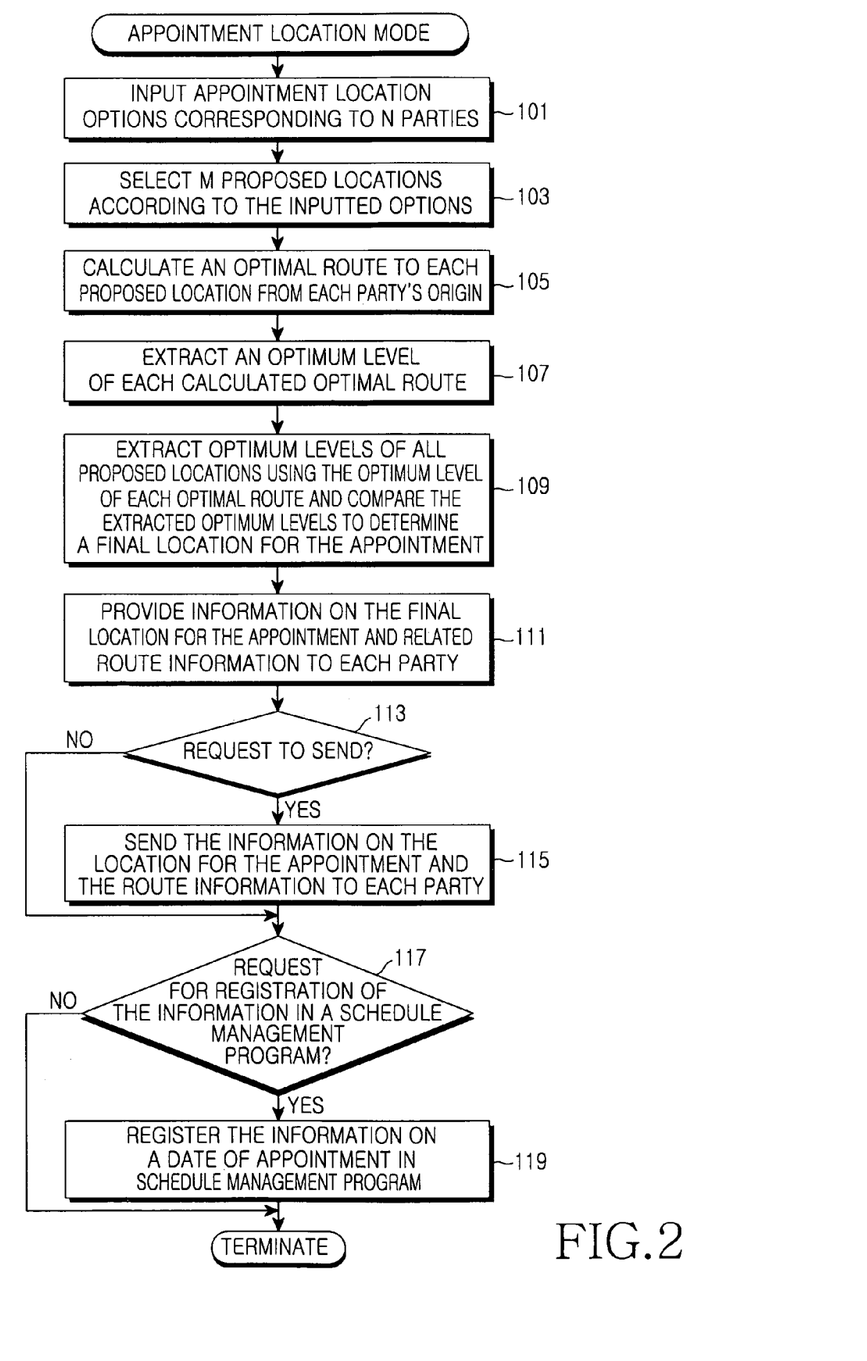
FIG. 2 is a flow chart showing the operation of a navigation terminal according to the present invention.
Figure 6:
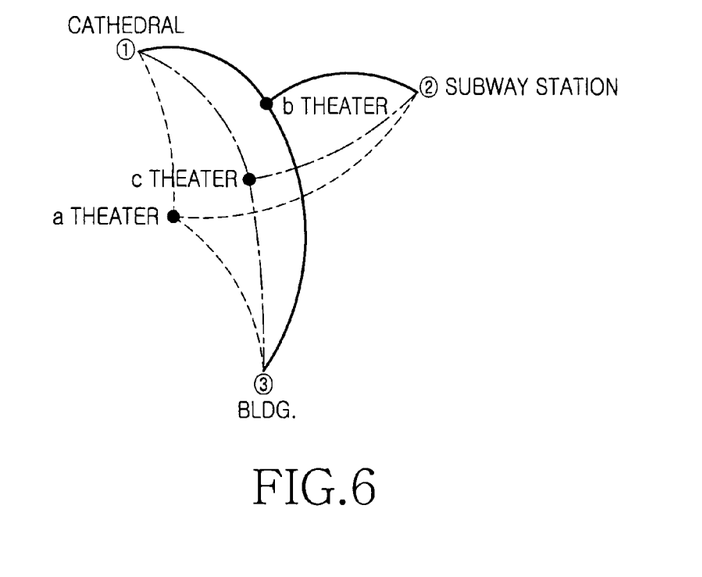
FIG. 6 is a view showing routes to multiple proposed locations according to the present invention.

In the navigation terminal 100, the location options unit 50 operates and functions as shown in FIG. 2. Proposed places to meet for an appointment and optimal routes to the respective proposed places from a location of each party of the appointment are depicted in FIG. 6. Referring to FIG. 2, when a user selects a menu for setting a place for an appointment through the data input unit 10, the location options unit 50 sets an appointment place setting mode in the navigation terminal 100. The location options unit 50 displays submenus of the appointment place setting menu so that the user can input information necessary to set a location for an appointment, such as the number of parties that will attend the appointment and appointment location options corresponding to the respective parties.

The parties of the appointment are those who make an appointment to meet together. The number of parties also refers to the number of different origins of the parties. The appointment place setting options are inputted in a number corresponding to the number of parties. For example, to determine a place for the appointment among three parties, three options are inputted.

The appointment place setting options include a starting point option, a means of travel option and a place selection option. The starting point option is for setting a starting point of travel for each party. In other words, three different starting points can be set for three parties of appointment. The means of travel option is for setting a means of travel or transportation to be used by each party to reach the place for the appointment. For example, the means of travel can be a car, bus, subway, foot, bicycle or motorcycle. The place selection option is for setting a factor primarily considered when calculating a particular route. The place selection option includes a distance preference, a travel time preference, a place preference, a most appropriate place preference, an appointment place limitation and a weight setting.

The distance preference is an option for giving preference to the shortest distance to determine a place for an appointment. If the distance preference is set, the location options unit 50 will control the route calculator 40 to calculate a shortest-distance route to a place of an appointment.

The travel time preference is an option for giving preference to the shortest travel time to determine a place for an appointment. If the travel time preference is set, the location options unit 50 will control the route calculator 40 to calculate a route to a place for an appointment which can be reached in the shortest time.

The place preference is an option for giving preference to a specific category of places to determine a place for an appointment. Such a specific category of places can be theaters, restaurants, amusement parks, squares, subway stations or shopping malls.

The most appropriate place preference is an option for determining the most appropriate place for an appointment in consideration of all factors (e.g., distance, travel time and place).

The appointment region limitation is an option to limit a place for an appointment to a specific region.

The weight setting is an option to give a weight to a specific factor, thereby influencing determination of a place to meet for an appointment. The weight setting includes a weight-to-place setting and a weight-to-person setting. The weight-to-place setting is for determining whether a frequently used place of appointment is included in the proposed places for an appointment and to give more weight to the frequently used place. The weight-to-person setting is for giving relatively more weight to a specific one of the multiple parties of appointment. In other words, when the weight-to-person is set, more weight is given to the appointment place setting option corresponding to a specific party so that a place convenient for the specific party can be finally set as the destination for the appointment.

One or more of the above sub-options (distance preference, travel time preference, place preference, most appropriate place preference, appointment place limitation and weight setting) included in the place selection option are selectively set according to the user's request. Referring to FIG. 6, when three people make an appointment to meet at a theater, the number of parties is set to three, and three different starting point setting options are set for the respective parties. First, three starting points are set for the three parties, e.g. cathedral for the first party, subway station for the second party and building for the third party. Second, first to third means of travel (for example, car, subway and foot) are set for each party. Third, the place selection option is set for each party. For example, the distance preference, travel time preference and place preference can be set for the first, second and third parties, respectively. It is possible to set theaters as a preferred category of places. According to the user's selection, an appointment region limitation can be set to limit a place for an appointment to a specific region. It is also possible to set a weight to a certain factor.

Referring back to FIG. 2, when appointment place setting options corresponding to n parties of the appointment are inputted in step 101, the location options unit 50 proceeds to step 103 in order to select multiple (m) proposed places for the appointment in compliance with the appointment place setting options through the route calculator 40. In step 105, the location options unit 50 controls the route calculator 40 to calculate an optimal route to each proposed place according to the appointment place setting options corresponding to the n parties and stores the calculated optimal route. For example, referring to FIG. 6, the place setting unit 50 selects three theaters a, b and c located in a specific region as proposed places for the appointment according to the appointment place setting options, and calculates an optimal route to each theater according to the appointment place setting option set for each party of the appointment. For the first party, optimal shortest-distance routes to get to the three theaters a, b and c by car from the cathedral will be calculated. For the second party, optimal routes to get to theaters a, b and c by subway from the subway station in the shortest time will be calculated. For the third party, optimal shortest-distance routes to get to theaters a, b and c on foot from the building will be calculated.

When the optimal routes to the proposed places for the appointment from the different starting points are calculated, the location options unit 50 proceeds to step 107 in order to obtain an optimum level of each calculated optimal route. The optimum level is a value showing how each calculated optimal route complies with the appointment place setting option previously set for each party. For example, among the optimal routes to theaters a, b and c from the location (starting point) of the first party or the third party, the shortest-distance route has the highest optimum level. Also, among the optimal routes to theaters a, b and c from the location (starting point) of the second party, the route having the shortest travel time has the highest optimum level.

In step 109, the location options unit 50 extracts optimum levels of the proposed places for the appointment based on the optimum levels obtained for the optimal routes, and compares the extracted optimum levels to finally determine the most appropriate place for the appointment. To be specific, the location options unit 50 extracts an optimum level of each proposed place by combining the optimum levels of the optimal routes for each party to get to the proposed places, and sets the place having the highest optimum level as the most appropriate place for the appointment. The process of extracting the optimum level of each proposed place is carried out to set a place convenient to all parties as the place to meet for the appointment. Referring to FIG. 6, optimum levels of theaters a, b and c are extracted and compared with each another in order to finally set one theater convenient to all the parties as the place to meet for the appointment. A weight setting can be used to determine the place for the appointment. For example, a weight-to-place can be set to give weight to frequently used places. If a frequently used place is included in the proposed places for the appointment, then weight will be given to the optimum level of the frequently used place, thereby influencing the final determination of the place for the appointment. If a weight-to-person is set, then weight will be given to the optimum levels of the optimal routes calculated for a specific party, which will also influence the final determination of the place for the appointment.

In step 111, the location options unit 50 offers optimal route information calculated in step 105 in relation to the place of appointment finally determined in step 109. In step 113, the location options unit 50 detects whether the user inputs a request to send. Upon detecting the request, the location options unit 50 proceeds to step 115. If the request is not inputted, the location options unit 50 will then proceed to step 117. In step 115, the location options unit 50 sends information on the final location for the appointment and related route information to each party, and proceeds to step 117. If steps of 101 through 113 were performed in a navigation terminal of the first party, the navigation terminal of the first party will send the place information and the route information to the other (second and third) parties' respective navigation terminals upon the request inputted by the first party. At this time, it is possible to send such information to all the parties of appointment or only to a specific party according to the first party user's selection.

Figure 5:
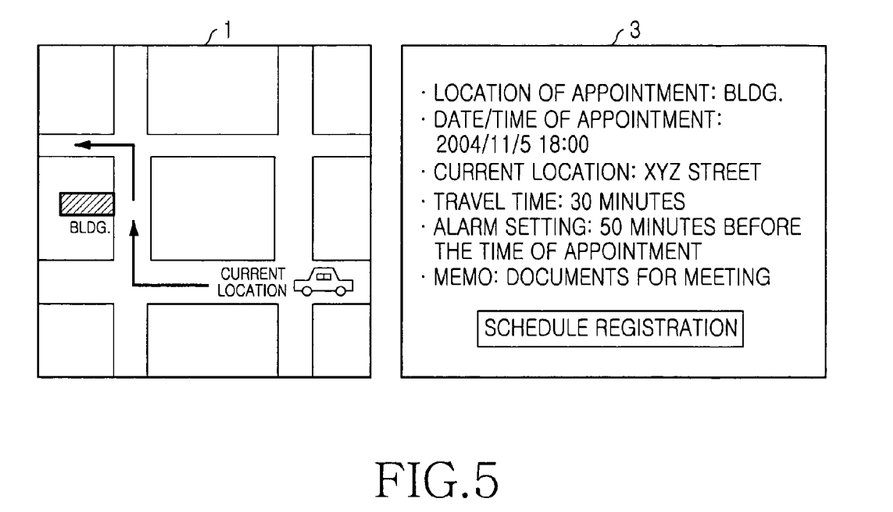
FIG. 5 is a display of route information according to the present invention.

In step 117, the location options unit 50 determines whether the user inputs a request for registration of the above information in a schedule management program. If the request is inputted, the location options unit 50 will proceed to step 119. Otherwise, the location options unit 50 will terminate the appointment location process. In step 119, the location options unit 50 controls the schedule management unit 60 to register the determined location for the appointment and the calculated optimal route on a date of appointment in the schedule management program, and terminates the process. When the date of appointment is reached, the location options unit 50 alerts the user of the appointment and displays the information on the location to meet for the appointment and the related route information on the display unit 30. The display of the information is illustrated in FIG. 5, in which a first display screen 1 shows route information, and a second display screen 3 shows schedule information.

In the above description, a navigation terminal 100 capable of determining a location for an appointment and providing related route information according to the present invention has been explained. According to another embodiment of the present invention, a navigation system can be configured. In the navigation system, a communication terminal can request a route information providing server to set a location for an appointment. Upon receiving the request, the server sets the most appropriate location for the appointment through steps similar to those explained above.

Figure 3:
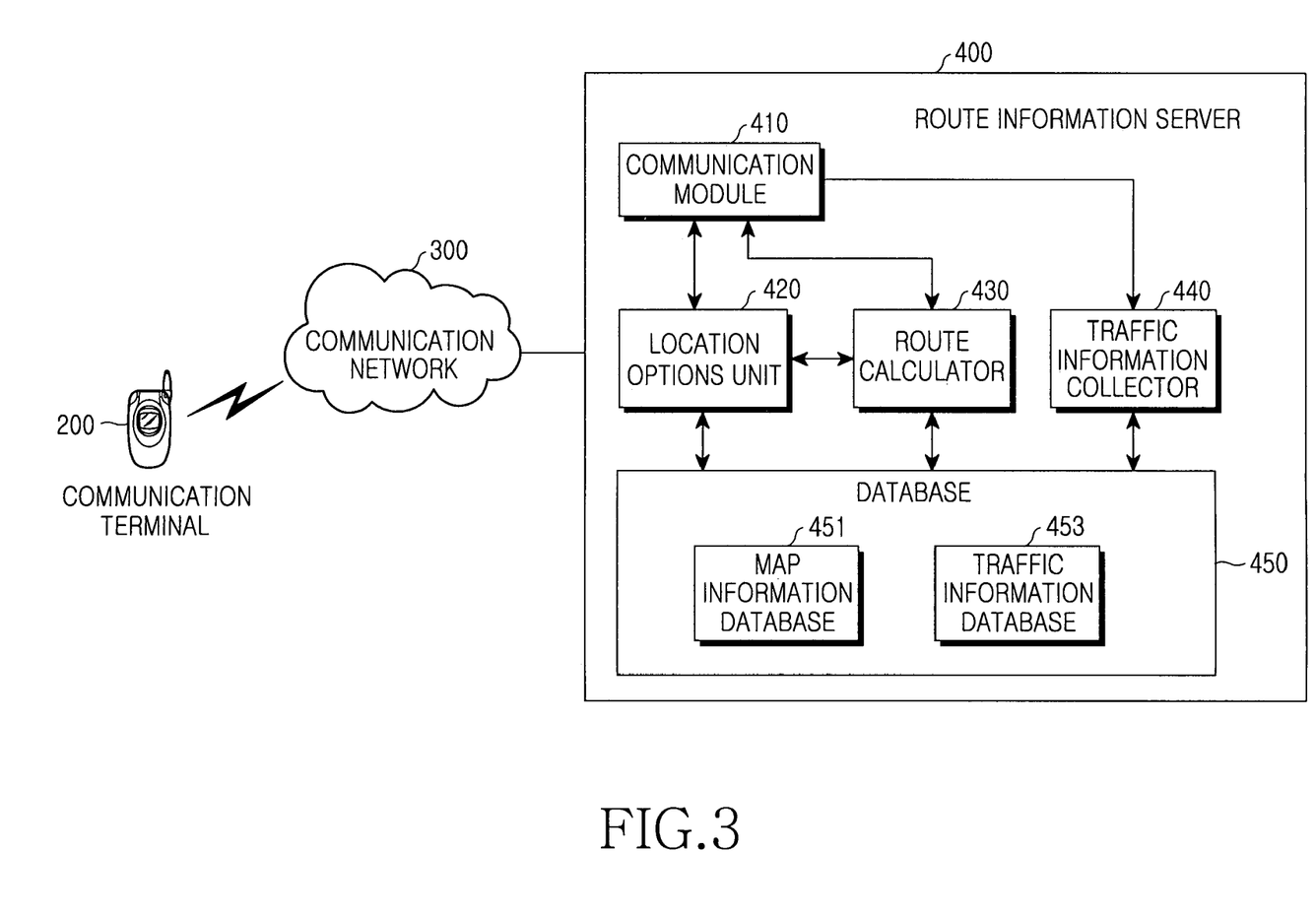
FIG. 3 is a block diagram of a navigation system according to the present invention.

FIG. 3 is a block diagram of a navigation system according to the present invention.

Referring to FIG. 3, the navigation system includes a communication terminal 200, a wireless communication network 300 and a route information server 400.

The communication terminal 200 can communicate with the route information server 400 through access to the wireless communication network 300. The communication terminal 200 stores basic map data necessary to display route information and has a route calculation function. The communication terminal 200 can implement a menu for inputting information necessary to determine a location for an appointment, that is, a menu for setting the number of parties that will attend the appointment and appointment location options corresponding to the respective parties.

The route information server 400 is connected to the wireless communication network 300. The server 400 includes a communication module 410, a location options unit 420, a route calculator 430, a traffic information collector 440 and a database 450. The communication module 410 performs communication with the wireless communication network and enables communication with another communication terminal.

The route calculator 430 calculates a route from an origin to a destination using all route options applied to the travel route between the origin and the destination and a subregion route option applied to a specific subregion in the travel route.

The location options unit 420 controls the operation of the route calculator 430 in order to set multiple proposed locations according to various options inputted from the communication terminal 200 to set an appropriate location for an appointment. The location options unit 420 calculates an optimal route to each proposed location from the origin of each party, extracts an optimum level of each calculated optimal route and finally determines the most appropriate location for the appointment.

The traffic information collector 440 collects real-time traffic information from outside sources and stores the collected traffic information in the database 450.

The database 450 includes a map information database 451 and a traffic information database 453. The map information database 451 stores map data showing roads, buildings and points of interest and information about accessible public transportation means. The traffic information database 453 stores roadway traffic information. The traffic information is updated by the traffic information collector 440.

When the route information server 400 receives information on the number of parties of appointment and appointment location options corresponding to the respective parties from the communication terminal 200, it sets the most appropriate location for the appointment through steps similar to those performed in the navigation terminal 100. In other words, the route information server 400 sets multiple proposed places, calculates an optimal route to each proposed location from each party's origin, extracts an optimum level of each calculated route to determine a final location for the appointment, and sends information on the final location for the appointment to the communication terminal 200. These steps for determining a place to meet for an appointment are depicted in FIG. 4.

Figure 4:
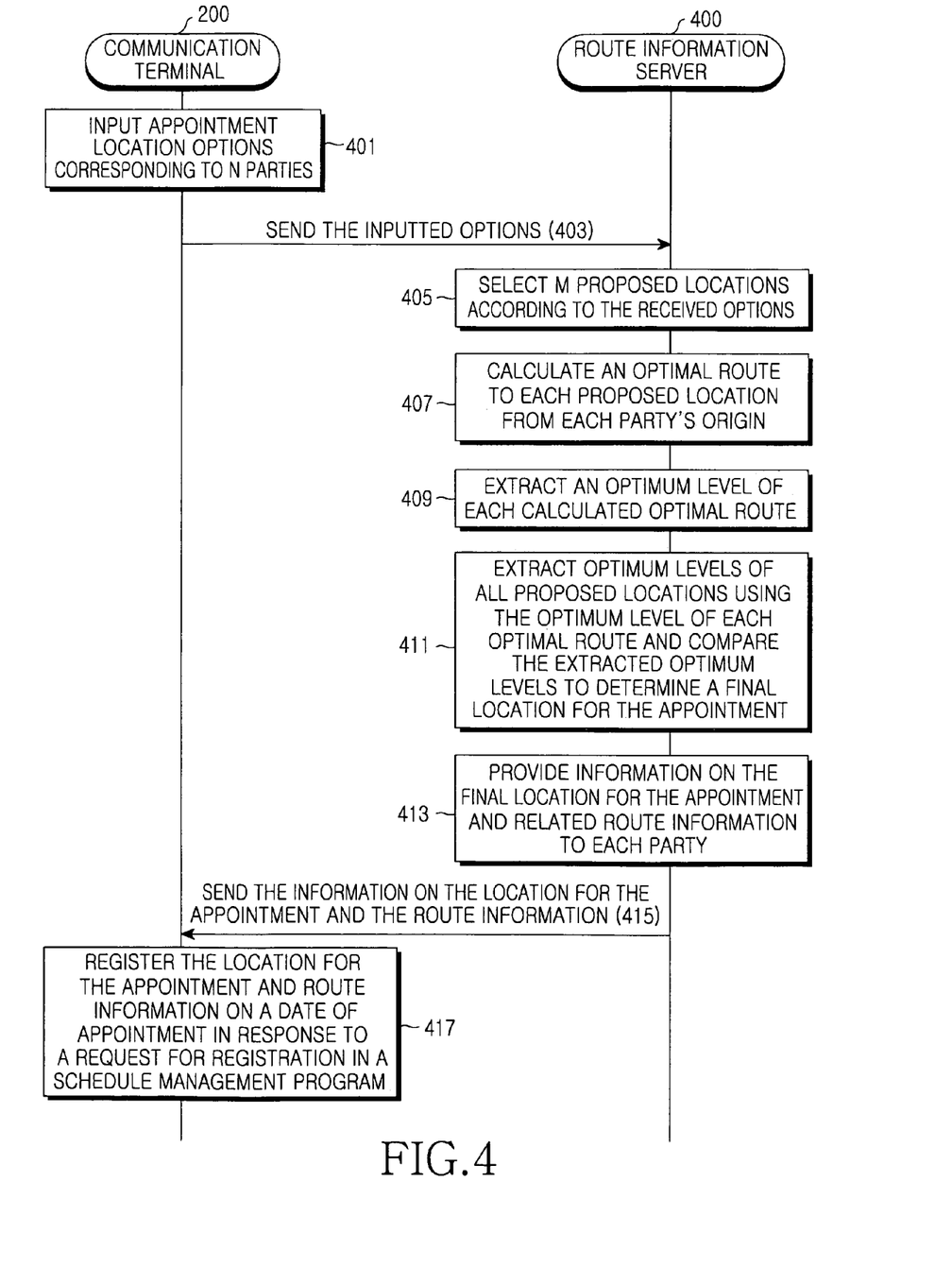
FIG. 4 is a flow chart showing messages sent and received in a navigation system according to the present invention.

Referring to FIG. 4, when a user inputs the number (n) of parties of appointment and appointment location options corresponding to the respective parties, the communication terminal 200 proceeds to step 403 in order to send the inputted information to the route information server 400 and request to set the most appropriate location for the appointment.

Upon receiving the information on the number of parties and the appointment location options from the communication terminal 200, the route information server 400 proceeds to step 405. In step 405, the route information server 400 sets multiple (m) proposed locations for the appointment according to the received appointment location options. In step 407, the route information server 400 calculates an optimal route to each proposed location from each party's location according to the appointment location option corresponding to the party. In step 409, the route information server 400 extracts an optimum level of each calculated optimal route. In step 411, the route information server 400 extracts optimum levels of all the proposed locations based on the optimum levels obtained for the optimal routes from origins of the respective parties, and compares the extracted optimum levels to finally set the location having the highest optimum level as the most appropriate location for the appointment. In step 413, the route information server 400 sends information on the determined location for the appointment and related route information to each party. In other words, the communication terminal 200 receives the location information and the route information from the route information server 400. At this time, route information server 400 can send the location information and the route information to all the parties of appointment or only to a specific party according to the request from the communication terminal 200.

Upon receiving the place information and the route information from the route information server 400 in step 413, the communication terminal 200 proceeds to step 417 in order to register the received information on a date of appointment in the schedule management program, and terminates the appointment location process.

As explained above, a navigation terminal capable of calculating a route or a route information server sets multiple proposed locations for an appointment according to various conditions or options provided by a user for the determination of an appropriate location for the appointment between multiple parties. The navigation terminal or the route information server calculates an optimal route to each proposed location from each party's location and extracts an optimum level of each calculated route to finally determine the most appropriate location for the appointment. The navigation terminal or the route information server automatically sets a location most appropriate and convenient to all parties of appointment, thereby enhancing convenience and effective time management.

While the present invention has been particularly shown and described with reference to certain preferred embodiments thereof, it will be understood by those of ordinary skill in the art that various changes in form and detail may be made therein without departing from the spirit and scope of the present invention as defined by the appended claims.

What is claimed is:

1. A method for determining a location for an appointment using a navigation system, comprising the steps of:
   inputting appointment location options corresponding to at least two parties for an appointment;
   setting a plurality of proposed locations according to the inputted options;
   calculating an optimal route to each proposed location from an origin of each party according to the appointment location option corresponding to each party;
   determining how each optimal route complies with the appointment location option corresponding to each party to extract an optimum level of each optimal route; and
   extracting the optimum levels of the optimal routes to each proposed location and comparing all the extracted optimum levels to determine a final location for the appointment.

2. The method according to claim 1, further comprising sending, to each party, information on the final location for the appointment and an optimal route calculated in relation to the final location.

3. The method according to claim 1, further comprising registering the final location for the appointment in a schedule management program of a corresponding date of appointment according to a user's request.

4. The method according to claim 1, further comprising registering the final location for the appointment and a final optimal route to the final location in a schedule management program of a corresponding date of appointment according to a user's request.

5. The method according to claim 1, wherein said appointment location options are used to determine the final location and calculate the proposed locations and are set to a number corresponding to an amount of the parties.

6. The method according to claim 1, wherein said appointment location options include an origin option, a means of travel option and location selection options for each party.

7. The method according to claim 6, wherein said means of travel option defines a means of travel that will be used by each party and includes a car, bus, subway, walking and bicycle.

8. The method according to claim 6, wherein said location selection options include a distance preference, a travel time preference, a place preference, a most appropriate place preference, an appointment place limitation and a weight setting.

9. The method according to claim 8, wherein said distance preference is an option to give preference to the shortest distance and calculate a shortest-distance route to each proposed location for the appointment.

10. The method according to claim 8, wherein said travel time preference is an option to give preference to a shortest travel time and calculate a route to each proposed location for the appointment which can be reached in the shortest travel time.

11. The method according to claim 8, wherein said place preference is an option to give preference to a specific category of locations to determine a location for the appointment.

12. The method according to claim 11, wherein said specific category of locations includes theaters, restaurants, amusement parks, squares, subway stations and shopping malls.

13. The method according to claim 8, wherein said most appropriate place preference is an option to determine the most appropriate place to meet in consideration of factors including distance, travel time and place.

14. The method according to claim 8, wherein said appointment place limitation is an option to limit a location for the appointment to a specific region.

15. The method according to claim 8, wherein said weight setting is an option to give more weight to a selected factor as compared to the other factors in the location selection options.

16. The method according to claim 15, wherein said weight setting includes a weight-to-place setting for determining whether a frequently used location of appointment is included in the proposed locations for the appointment and for giving more weight to the frequently used place as compared to the proposed locations.

17. The method according to claim 15, wherein said weight setting includes a weight-to-person setting for giving more weight to a selected one of the parties for the appointment and to the appointment location option corresponding to the selected party so that a convenient location for the specific party can be set as the final location for the appointment.

18. The method according to claim 8, wherein said location selection option is set by selectively setting at least one of the distance preference, travel time preference, location preference, most appropriate location preference, appointment location limitation and weight setting included in the location selection option according to a user's request.

19. A navigation terminal in a navigation system, comprising:
   a route calculator for calculating a route from an origin to a destination using a route option applied to an entire travel route between the origin and the destination and a subregion route option applied to a selected subregion in the travel route; and
   a location setting unit for controlling the operation of the route calculator to set a plurality of proposed locations according to appointment location options inputted by a user for two or more parties for an appointment, calculate an optimal route to each proposed location from each party's origin, extract an optimum level of each calculated optimal route showing how each optimal route complies with the appointment location options, extract optimum levels of optimal routes to each location, and compare all the extracted optimum levels to determine a final location for the appointment.

20. The navigation terminal according to claim 19, further comprising a schedule management unit for registering the final location for the appointment and an optimal route to the final location in a schedule management program of a corresponding date of appointment according to the user's request.

21. The navigation terminal according to claim 19, wherein said location setting unit sends information on the final location for the appointment and an optimal route to the final location to each party.

22. A method for determining a location for an appointment using a navigation system, which comprises the steps of:
   inputting appointment location options corresponding to at least two parties for an appointment in a communication terminal and sending the input options from the communication terminal;
   setting a plurality of proposed locations in a route information server according to the appointment location options from the communication terminal;
   calculating an optimal route to each proposed location from an origin of each party in the route information server according to the appointment location option corresponding to each party;
   determining how each optimal route complies with the appointment location option corresponding to each party to extract an optimum level of each optimal route in the route information server;
   extracting the optimum levels of the optimal routes to each proposed location and comparing all the extracted optimum levels in the route information sewer to determine a final location for the appointment; and
   sending information on the final location for the appointment and an optimal route calculated in relation to the final location to each party from the route information server.

23. The method according to claim 22, further comprising registering the final location for the appointment and the optimal route to the final location in a schedule management program of a corresponding date of appointment according to a user's request.

24. A navigation system for setting a location for an appointment, comprising:
   a communication terminal for inputting appointment location options corresponding to at least two parties for an appointment, sending the inputted options and receiving information on a final location for the appointment and an optimal route for each party to reach the final location; and
   a route information server for setting a plurality of proposed locations according to the appointment location options received from the communication terminal, calculating an optimal route to each proposed location from each party's origin, extracting an optimum level of each calculated optimal route showing how each optimal route complies with the appointment location options, extracting optimum levels of optimal routes to each proposed location, comparing all the extracted optimum levels to determine a final location for the appointment, and sending information on the final location for the appointment and a calculated optimal route to the final location to each party.

25. The system according to claim 24, wherein said communication terminal receives the information on the final location for the appointment and the calculated optimal route to the final location from the route information server and registers the received information in a schedule management program of a corresponding date of appointment according to a user's request.

* * * * *

UNITED STATES PATENT AND TRADEMARK OFFICE
CERTIFICATE OF CORRECTION

PATENT NO. : 7,606,661 B2  Page 1 of 1
APPLICATION NO. : 11/434532
DATED : October 20, 2009
INVENTOR(S) : Min-Hyo Kwak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Twelfth Day of October, 2010

David J. Kappos
*Director of the United States Patent and Trademark Office*